US008710825B2

(12) United States Patent
Roylance et al.

(10) Patent No.: US 8,710,825 B2
(45) Date of Patent: *Apr. 29, 2014

(54) METHOD AND SYSTEM OF A SENSOR INTERFACE HAVING DYNAMIC AUTOMATIC GAIN CONTROL

(75) Inventors: James Merrill Roylance, Carson City, NV (US); Daniel Zahi Abawi, Gardnerville, NV (US); Biplab Deb, Maharashtra (IN)

(73) Assignee: General Electric Company, Houston, TX (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/033,249

(22) Filed: Feb. 23, 2011

(65) Prior Publication Data

US 2012/0212214 A1    Aug. 23, 2012

(51) Int. Cl.
*G01P 3/66* (2006.01)
*G01R 35/00* (2006.01)
*G01B 7/30* (2006.01)
*G01B 7/14* (2006.01)

(52) U.S. Cl.
USPC ...... 324/178; 324/173; 324/202; 324/207.24; 324/207.25

(58) Field of Classification Search
USPC .................................. 324/202, 178
See application file for complete search history.

(56) References Cited

U.S. PATENT DOCUMENTS

| 3,421,317 | A  | 1/1969  | Bedford |
| 5,477,142 | A  | 12/1995 | Good et al. |
| 5,510,706 | A  | 4/1996  | Good |
| 6,040,692 | A  | 3/2000  | Manlove et al. |
| 6,133,728 | A  | 10/2000 | Manlove et al. |
| 7,498,886 | B2 | 3/2009  | Lin |
| 2011/0085800 | A1 | 4/2011 | Cerisola et al. |

FOREIGN PATENT DOCUMENTS

| EP | 0959358 A1 | 11/1999 |
| EP | 1361444 A2 | 11/2003 |

OTHER PUBLICATIONS

EP Search Report and Written Opinion dated Jun. 25, 2012 from corresponding EP Application No. 12150301.9.

*Primary Examiner* — Bot Ledynh
(74) *Attorney, Agent, or Firm* — Fletcher Yoder, P.C.

(57) ABSTRACT

Embodiments of the invention described herein provide a magnetic sensor interface capable of adjusting signal conditioning dynamically such that the true positive and negative peaks of the input signal are maintained for a given target across its entire speed range (0-Max rpm), therefore increasing the signal to noise ratio at low speeds and avoiding clipping or distortion at high speeds. In one aspect, a method comprises receiving an alternating differential voltage signal from a sensor. The alternating differential voltage signal has an amplitude that changes over time. The alternating differential voltage signal is converted to an attenuated single-ended voltage signal that can be dynamically scaled. The attenuated single-ended voltage signal can be scaled by multiplying the attenuated single-ended voltage signal by a scaling factor. The scaling factor is selected relative to a signal-to-noise ratio of the scaled attenuated single-ended voltage signal.

28 Claims, 5 Drawing Sheets

METHOD AND SYSTEM OF A SENSOR INTERFACE HAVING DYNAMIC AUTOMATIC GAIN CONTROL

CROSS REFERENCE TO RELATED APPLICATION

This application is related to U.S. patent application Ser. No. 13/033,234, filed on Feb. 23, 2011, which is fully incorporated herein by reference and made a part hereof.

BACKGROUND OF THE INVENTION

In many instances, machines such as for example electric motors, electric generators, internal-combustion engines, jet engines, turbines, and the like, and the systems they drive, are actively monitored by various monitoring systems for performance and operational characteristics including for example vibration, heat, noise, electrical characteristics (e.g., current, voltage, resistance, etc.), environmental effects, and the like. Generally, the monitoring systems that monitor these machines are comprised of one or more transducers that are proximate to and associated with the machine. For example, passive magnetic or reluctance sensors may be used by monitoring systems. Hereinafter, these sensors will be referred to simply as "sensors, "magnetic sensors," or "passive magnetic sensors," which is intended to include passive magnetic and reluctance sensors.

Generally, passive magnetic sensors are constructed of a permanent magnet and a coil with signal wires connecting to each side of the coil. The magnet creates a field (lines of flux), which extends from the end of the magnetic sensor into the air. As a ferrous object approaches the tip of the magnetic sensor (i.e., the probe tip), the object interacts with the magnetic field originating from the magnet encased in the magnetic sensor, thereby inducing a current flow in the coil and in turn creating alternating current (AC) voltage that can be seen on the signal wires acting as the magnetic sensor outputs. As the target enters and then leaves area occupied by the flux lines, this creates a positive voltage peak followed by a negative voltage peak. The voltage output can appear to be sinusoidal in nature, but can be distorted depending on the material composition and geometry of the target. Several factors contribute to the characteristics of the output signal generated by passive magnetic sensors including surface speed of the target, gap size, target geometry, and load impedance.

Surface speed is the speed at which the target passes the magnetic sensor's probe tip and directly affects the amplitude of the pulse created by the magnetic sensor. The exact function relating target speed to output voltage varies from magnetic sensor to magnetic sensor, but correlation between speed and output voltage is nearly a linear function (proportional). Gap size refers to the distance between the target and the magnetic sensor's probe tip when the target passes and it influences the output voltage as well. The smaller the gap, the larger the output voltage will be. Typical gap settings for magnetic sensors can be around 25 to 30 mils. Generally, the relationship between gap size and voltage output is nonlinear in nature. Decreasing the gap can drastically increase output voltage. The geometric dimensions of a target can also affect the amplitude and shape of the output voltage. Generally, the larger the target, the greater the amplitude. Load impedance, relative to the internal impedance of the magnetic sensor, dictates the amount of magnetic sensor output voltage that will be seen by that load. Magnetic sensors are generally designed with the lowest practical impedance consistent with providing maximum output. The load impedance should be high in relation to the impedance of the magnetic sensor to minimize the voltage drop across the coil and to deliver the maximum output to the load. Generally the load impedance should be at least 10 times that of the internal impedance of the magnetic sensor.

Benefits of using magnetic sensors include that they are passive and therefore don't require external power, they are simplistic in design and therefore highly reliable, and they are generally low cost. However, there are challenges to using these sensors as well. One challenge is that output signal amplitude can fluctuate drastically based on speed. This can make it difficult to analyze startup data characteristics of a machine ramping from, for example, zero to 3600 rpm. For example, magnetic sensor output voltage changes drastically (e.g., 10 mVp-p to 200Vp-p) with respect to the speed of the passing target. This characteristic can pose a challenge when monitoring the magnetic sensor output of a target passing at a low speed with the same accuracy of the output when the target passes at high speed. Slow speed signals need gain to improve the signal to noise ratio while high speed signals need to be attenuated to avoid clipping or distortion due to circuit limits. Another challenge is that due to the passive nature of magnetic sensors, a magnetic pickup has less drive strength and will not be able to drive a signal through long cables. Furthermore, magnetic sensors cannot be used for an accurate gap reading. While the amplitude can be indicative of the gap, the gap size cannot be accurately determined with a given output voltage due to the various other factors that influence the output as discussed above.

Therefore, systems and methods that overcome challenges in the art, some of which are described above, are desired. In particular, providing dynamic automatic gain control for a magnetic sensor that can be used to improve the accuracy of an output of the magnetic sensor for a target passing at a low speed and of the same target when the target passes at high speed would be valuable in addressing the above-described challenges.

BRIEF DESCRIPTION OF THE INVENTION

Embodiments of the invention described herein provide a magnetic sensor interface capable of adjusting signal conditioning dynamically such that the true positive and negative peaks of the input signal are maintained for a given target across its entire speed range (0-Max rpm), therefore increasing the signal to noise ratio at low speeds and avoiding clipping or distortion at high speeds.

In one aspect, a method is described. The method comprises receiving an alternating differential voltage signal from a sensor. The differential voltage signal has an amplitude that changes over time. The alternating differential voltage signal is converted to an attenuated single-ended voltage signal that can be dynamically scaled. The attenuated single-ended voltage signal can be scaled by multiplying the attenuated single-ended voltage signal by a scaling factor. The scaling factor is selected relative to a signal-to-noise ratio of the scaled attenuated single-ended voltage signal.

In another aspect, a system is described. The system is comprised of a sensor configured to produce an alternating differential voltage signal that has an amplitude that changes over time. Further comprising the system is a first circuit that receives the alternating differential voltage signal and converts the alternating differential voltage signal to an attenuated single-ended voltage signal. A second circuit dynamically scales the attenuated single-ended voltage signal by multiplying the attenuated single-ended voltage signal by a scaling factor. The scaling factor is selected relative to a signal-to-noise ratio of the scaled attenuated single-ended voltage signal.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. Further, when examples of ranges are provided herein, it is to be appreciated that the given ranges also include all subranges therebetween, unless specifically stated otherwise.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As described herein, embodiments of the invention described herein provide a magnetic sensor interface capable of adjusting signal conditioning dynamically such that the true positive and negative peaks of the input signal are maintained for a given target across its entire speed range (0-Max rpm), therefore increasing the signal to noise ratio at low speeds and avoiding clipping or distortion at high speeds. Magnetic sensor output voltages change drastically (e.g., 10 mVp-p to 200Vp-p) with respect to the speed of a passing target. This characteristic poses a challenge when monitoring the sensor output of a target passing at a low speed with the same accuracy of the output when the target passes at high speed. Slow speed signals need gain to improve the signal to noise ratio while high speed signals must be attenuated to avoid clipping or distortion due to circuit limits. Therefore, the technical effect of embodiments described herein is to provide a way to monitor the performance/behavior of a given target across its entire speed range (0-Max rpm) with a magnetic sensor. Embodiments of this invention allow the capture of signal content from low amplitude signals that previously would have been difficult to separate from the noise. Embodiments also provide an opportunity for better signal to noise ratio across a wide range of target speeds and their corresponding signal amplitudes because of the dynamic scaling.

Systems and methods described herein provide a magnetic sensor interface circuit capable of adjusting signal conditioning dynamically such that the true positive and negative peaks of the input signal are maintained. In one aspect, the interface accepts a differential voltage from a magnetic sensor. The differential voltage is converted to a single ended voltage signal and attenuated (if necessary) to avoid signal clipping. The attenuated single-ended voltage signal is scaled (gained or attenuated) relative to a signal to noise ratio without clipping or altering the signal waveform. In one aspect, the attenuated single-ended voltage signal is scaled (gained or attenuated) to improve or maximize the signal to noise of the signal waveform. In one aspect, the gain or attenuation is selected by an algorithm within a digital processor or field programmable gate array (FPGA), which monitors the input signal continuously by means of an analog-to-digital converter (ADC). The ADC provides a digital representation of the analog voltage seen across the magnetic sensor contacts. The ADC receives its input from the scaled attenuated single-ended voltage described herein. This provides a feedback loop that allows embodiments of the invention to detect the onset of clipping or signal alteration and adjust the scaling to ensure this does not happen.

Figure 1:
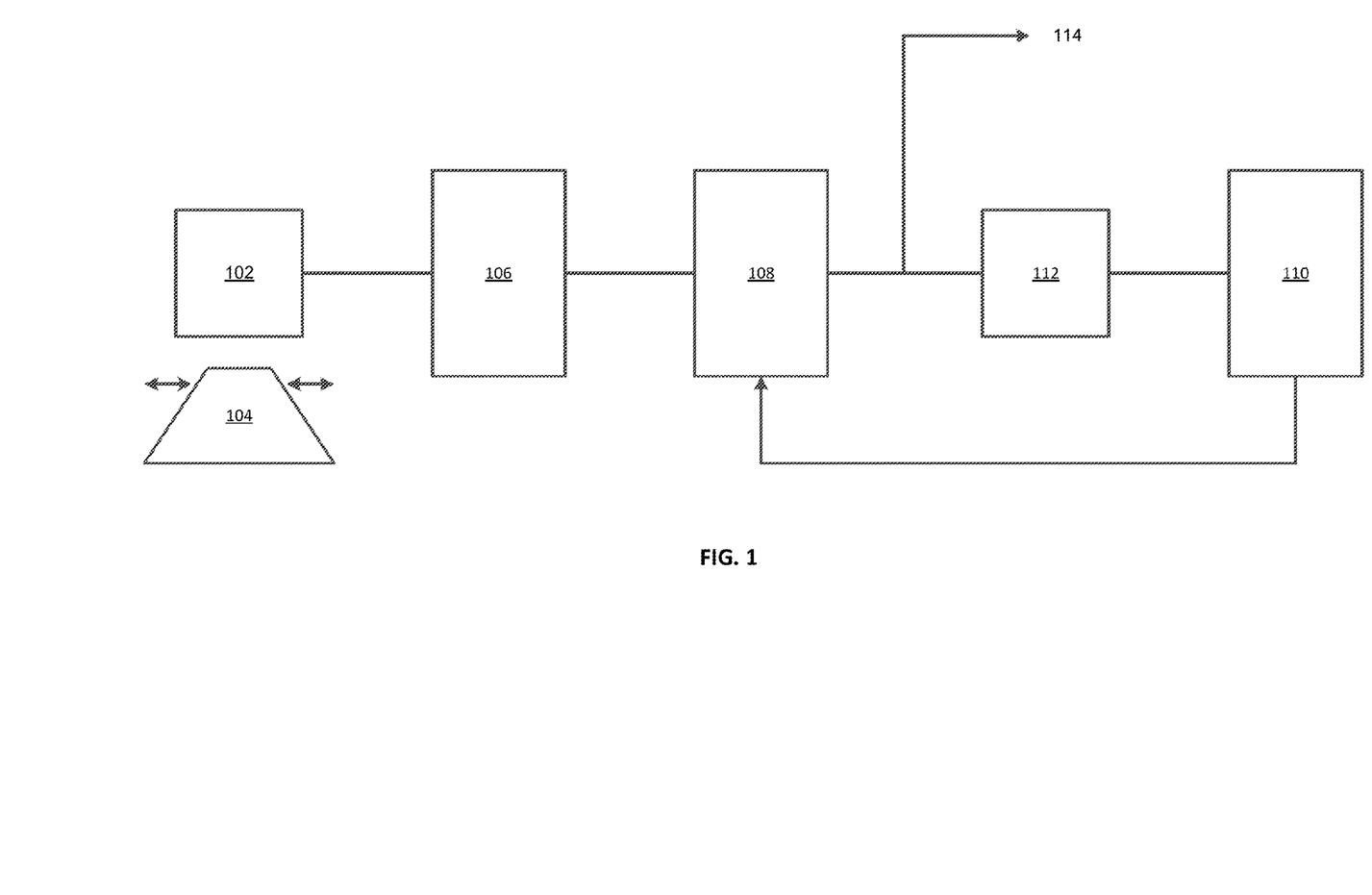
FIG. 1 is block diagram of one embodiment of a system according to the present invention.

FIG. 1 illustrates an overview block diagram of one embodiment of the present invention. The sensor 102 detects a target 104 passing proximate to the sensor 102. As described herein, in one aspect the sensor 102 can be a passive magnetic or reluctance sensor, as known to one of ordinary skill in the art. In one aspect, the target 104 passes by the sensor 102, thus producing a voltage pulse or signal by the sensor 102. In another aspect, the sensor 102 moves past the target 104 and produces the voltage signal. The voltage signal produced by the sensor 102 is related to several factors including target 104 material, target 104 geometry or shape, gap size between the target 104 and sensor 102, and the speed at which the target 104 passes the sensor 102 (or the sensor 102 passes the target 104). In one aspect, the voltage signal is an alternating differential voltage pulse (i.e., not referenced to ground or any other common point). In one aspect, the voltage signal can be symmetrical or asymmetrical about a horizontal (zero) axis. The amplitude of the alternating voltage signal changes over time as the target 104 approaches, moves beneath and passes by the sensor 102 (or the sensor 102 approaches and moves past the target 104). In one aspect, the alternating voltage signal is a sine wave. In one aspect, the alternating voltage signal is not a sign wave. In one aspect, the sensor 102 is a passive magnetic sensor as available from one of many different manufacturers. In one aspect, the sensor 102 can be a passive magnetic sensor or variable reluctance sensor as available from Al-Tek Instruments, Inc. (Cheshire, Conn.). In one aspect, the sensor 102 can be an Al-Tel model number 70085-1010 passive magnetic sensor. The target 104 can be various devices. In one aspect, the target 104 can be the blade of a turbine, such as a steam turbine, a gas turbine, or the like. In one aspect, the target 104 can be the blade of a compressor, such as a compressor used in a gas turbine or the like. In one aspect, the target 104 can be a gear tooth.

Figure 2:
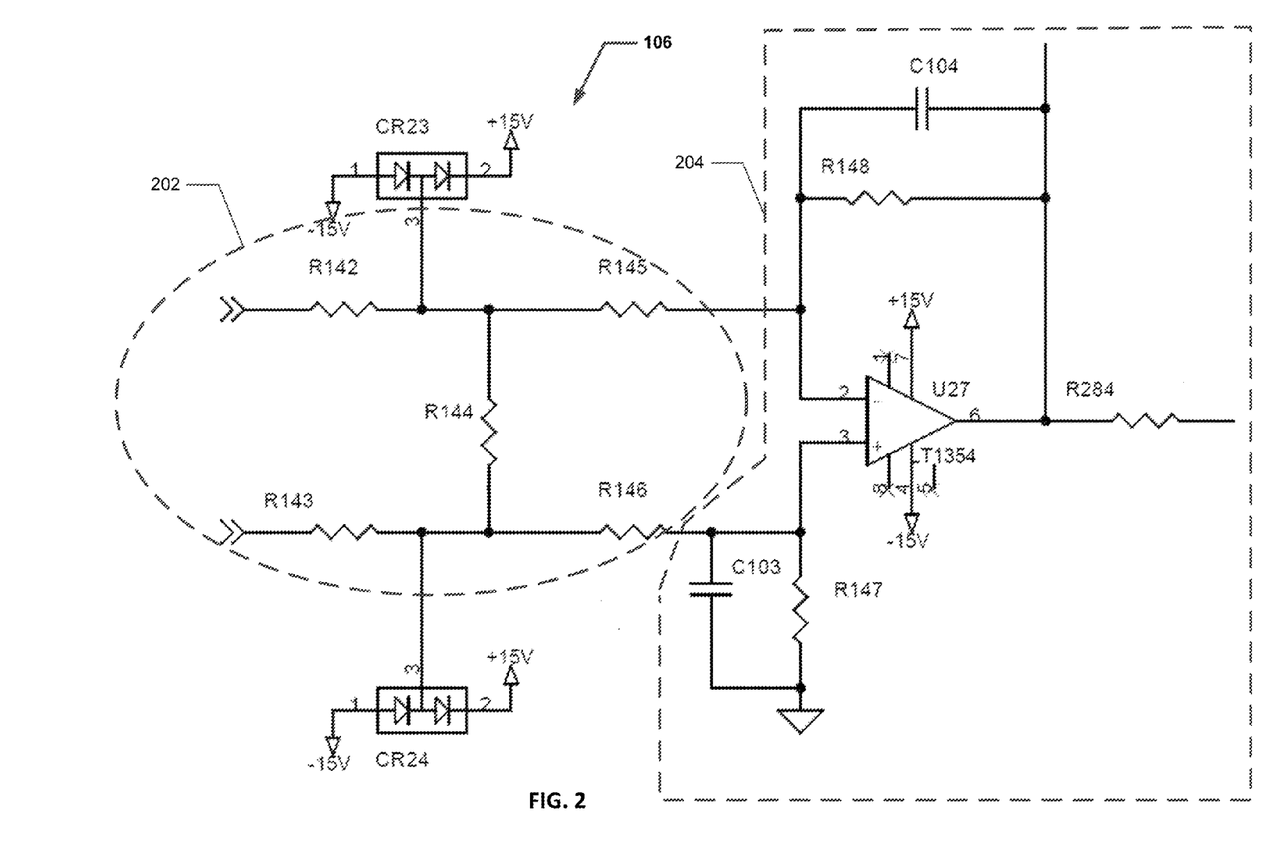
FIG. 2 is a schematic diagram of an embodiment of a circuit that can be used to convert the alternating differential voltage signal to an attenuated single-ended voltage signal according to one aspect of the present invention.

In one aspect, the alternating differential voltage signal produced by the sensor 102 is received by a circuit 106. In one aspect, the circuit 106 receives the alternating differential voltage signal and converts the alternating differential voltage signal to an attenuated single-ended voltage signal (i.e., referenced to ground or another common point). In one aspect, the circuit 106 attenuates or gains the alternating differential voltage signal depending upon the peak-to-peak value of the alternating differential voltage signal. In one aspect, the circuit 106 attenuates the alternating differential voltage by a fixed amount (i.e., the peak-to-peak value of the alternating differential voltage is constantly decreased by 10 percent, by 15 percent, by 20 percent, etc.). In one aspect, the circuit 106 converts the alternating differential voltage signal to the attenuated single-ended voltage signal by attenuating the alternating differential voltage signal by a fixed amount such that the attenuated single-ended voltage signal is less than or equal to a maximum attenuated voltage. In one aspect, the circuit 106 converts the alternating differential voltage signal to an attenuated single-ended voltage signal by multiplying the alternating differential voltage signal by a ratio of the maximum attenuated voltage to the maximum peak-to-peak value of the alternating differential voltage signal. In one aspect, the maximum peak-to-peak value of the alternating differential voltage signal can be about 250 volts peak-to-peak and the maximum attenuated voltage of the attenuated single-ended voltage signal can be about 30 volts peak-to-peak. In one aspect, the circuit 106 comprises a resistor divider 202 and an operational amplifier having a single-ended output 204 as shown in FIG. 2. FIG. 2 is a schematic diagram of an embodiment of a circuit 106 that can be used to convert the alternating differential voltage signal to an attenuated single-ended voltage signal according to one aspect of the present invention. In one aspect, converting the alternating differential voltage signal to an attenuated single-ended voltage signal comprises using the resistor divider 202 to divide the alternating differential voltage signal and providing a differential input to the operational amplifier having a single-ended output 204. In one non-limiting example, resistor divider 202 can be comprised of resistors having the following values: R142=4.99 kilo-ohms, R143=4.99 kilo-ohms, R144=3.01 kilo-ohms, R145=121 kilo-ohms and R146=121 kilo-ohms. Also, in one non-limiting example, the operational amplifier circuit having a single-ended output 204 can be comprised of resistors and capacitors having the following values: R147=49.9 kilo-ohms, R148=49.9 kilo-ohms, R284=2.0 kilo-ohms, C103=5.6 Pico-farads, and C104=5.6 Pico-farads. The circuit of FIG. 2 is provided as a non-limiting example and it is to be appreciated that other circuits can be used to perform the same function.

Returning to FIG. 1, the attenuated single-ended voltage signal is dynamically scaled by multiplying the attenuated single-ended voltage signal by a scaling factor. In one aspect, the scaling factor is selected relative to a signal-to-noise ratio of the scaled attenuated single-ended voltage signal. In one aspect, the scaling factor is selected to improve or maximize the signal to noise of the signal waveform. In one aspect the circuit 106 provides the attenuated single-ended voltage signal to a second circuit 108. The second circuit 108 dynamically scales the attenuated single-ended voltage signal. In one aspect, a field programmable gate array (FPGA) or digital processor 110 associated with the second circuit 108 automatically sets the scaling factor such that a product of the scaling factor times the attenuated single-ended voltage signal is less than or equal to a maximum input signal voltage. In one aspect, the maximum input signal voltage can be about 6.5 volts peak-to-peak. In one aspect, the FPGA or digital processor 110 associated with the second circuit 108 automatically sets the scaling factor in accordance with an algorithm. In one aspect, the algorithm comprises the FPGA or digital processor 110 receiving a digital input representative of the alternating differential voltage signal produced by the sensor 102 and scaling the attenuated single-ended voltage signal in proportion to that input. In one aspect, the digital input comprises the scaled output of the second circuit 108 converted to a digital signal by an analog-to-digital convertor (ADC) 112. In one aspect, if the digital input to the FPGA or digital processor 110 is below a lower defined value, $Value_L$, then the scaling factor is greater than one and the attenuated single-ended voltage signal is amplified in order to increase its signal to noise ratio. In one aspect, if the digital input to the FPGA or digital processor 110 is equal to or between a lower defined value, $Value_L$, and an upper defined value, $Value_U$, then the scaling factor is one and the attenuated single-ended voltage signal is neither amplified nor attenuated. In one aspect, if the digital input to the FPGA or digital processor 110 is greater than an upper defined value, $Value_U$, then the scaling factor is less than one and the attenuated single-ended voltage signal is further attenuated in order to avoid clipping or distortion of the signal. In one aspect, an output 114 of circuit 108 can be provided to a monitoring system such as a turbine, compressor, or the like blade health monitoring system. In one aspect, the output 114 has a value that can be the same or less than the maximum input voltage level. In one aspect, operational characteristics and specifications of the monitoring system can determine the value for the maximum input voltage signal. In one aspect, operational characteristics and specifications of the ADC 112 can determine the value for the maximum input voltage signal.

Figure 3:
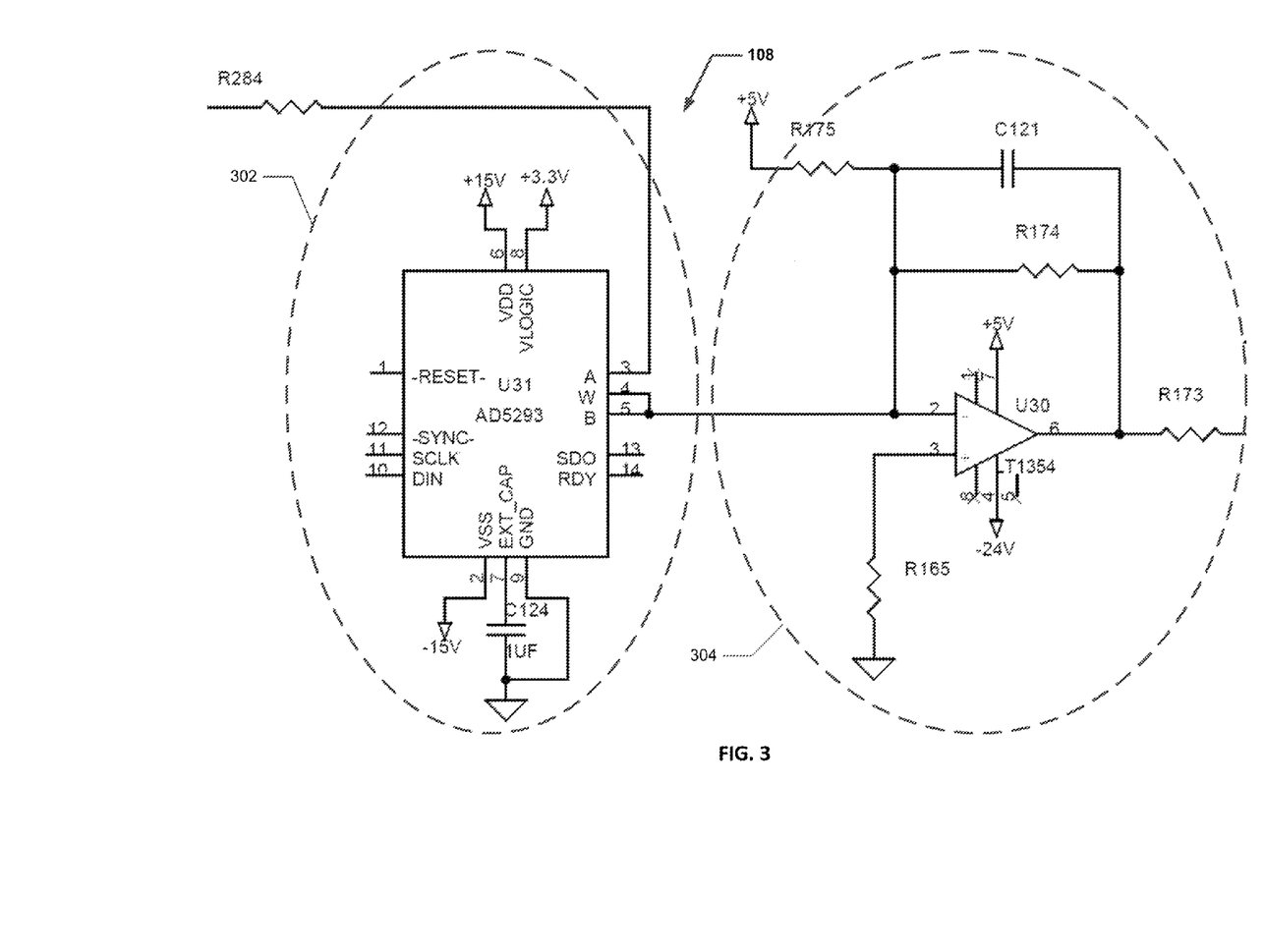
FIG. 3 is a schematic diagram of an embodiment of a circuit that can be used to dynamically scale the attenuated single-ended voltage signal according to one aspect of the present invention.

Referring now to FIGS. 1 and 3, in one aspect, the second circuit 108 dynamically scaling the attenuated single-ended voltage signal comprises the second circuit 108 dynamically scaling the attenuated single-ended voltage signal using a scaling op-amp circuit 304 that has a digital potentiometer 302 controlled by the FPGA or digital processor 110. The FPGA or digital processor 110 provides an input to the digital potentiometer 302 that dynamically scales the attenuated single-ended voltage signal in accordance with the above-described algorithm. In one aspect, the FPGA or digital processor 110 scales the attenuated single-ended voltage signal by receiving a digital representation of the attenuated single-ended voltage signal from the ADC 112 and automatically adjusting the digital potentiometer 302 such that the scaling factor times the attenuated single-ended voltage level is less than or equal to the maximum input signal voltage. In one aspect, the scaling factor is 1 or greater such as, for example, 1.0. 1.1. 1.2. 2.0, 2.5, 10.0 etc. In another aspect the scaling factor is less than 1 such as for example, 0.95, 0.90, 0.5. 0.33, 0.10. 0.01, etc.

FIG. 3 is a schematic diagram of an embodiment of a circuit 108 that can be used to dynamically scale the attenuated single-ended voltage signal according to one aspect of the present invention. In one aspect, dynamically scaling the attenuated single-ended voltage signal comprises the FPGA or processor 110 automatically adjusting the digital potentiometer 302 in accordance with the above-described algorithm such that an output of a scaling operational amplifier circuit 304 has an improved signal to noise ratio and is not so large as to result in clipping or distortion of the signal. In one aspect, the signal to noise ratio of the output is maximized. In one aspect, an output of the digital potentiometer 302 is used as an input to the scaling operational amplifier circuit 304 to provide dynamic scaling of the output of the scaling operational amplifier circuit 304. In one non-limiting example, digital potentiometer 302 can be further comprised of capacitor C124 having a value of 1 micro-farad. Also, in one non-limiting example the scaling operational amplifier circuit 304 can be comprised of resistors and capacitors having the following values: R173=49.9 kilo-ohms, R174=20.0 kilo-ohms, R175=10.0 kilo-ohms, R165=4.99 kilo-ohms, and C121=5.6 Pico-farads. In one aspect, the digital potentiometer 302 can be a single-channel, 1024-position digital potentiometer as available from, for example, Analog Devices, Inc. (Norwood, Mass.). In one aspect, the digital potentiometer 302 can be an Analog Devices, Inc. model AD5293 digital potentiometer. While the circuit of FIG. 3 is provided as a non-limiting example, it is to be appreciated that other circuits can be used to perform the same function.

Figure 4:
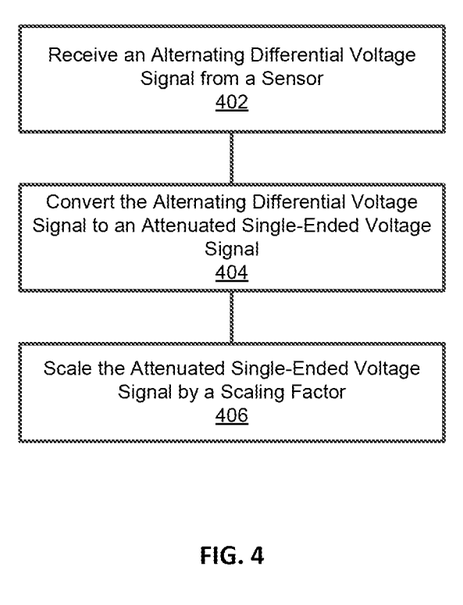
FIG. 4 is a flowchart that illustrates operations that may be taken in order to provide dynamic automatic gain control for a magnetic sensor.

Referring now to FIG. 4, the operations are illustrated that may be taken in order to provide dynamic automatic gain control for a magnetic sensor. At step 402, an alternating differential voltage signal is received from a sensor. In one aspect, the sensor is a passive magnetic sensor. In one aspect, the sensor is a variable reluctance sensor. The alternating differential voltage signal has an amplitude that changes over time. For example, if the sensor were monitoring a stage of blades of a turbine, then the amplitude of the alternating differential voltage signal from the sensor would increase as the machine ramps up from zero revolutions per minute (rpm) to operating speed (e.g., 3600 rpm). This is because the alternating differential voltage signal produced by the sensor is related to a target's material composition, a gap between the sensor and the target, and a speed at which the target passes the sensor (or sensor passes the target). In one aspect, the target is a turbine blade. At step 404, the alternating differential voltage signal is converted to an attenuated single-ended voltage signal. In one aspect, the alternating differential voltage signal has a maximum peak-to-peak value and converting the alternating differential voltage signal to an attenuated single-ended voltage signal comprises the alternating differential voltage signal multiplied by a ratio of a maximum attenuated voltage to the maximum peak-to-peak value. In one aspect, the maximum peak-to-peak value of the alternating differential voltage signal can be about 250 volts peak-to-peak and the maximum attenuated voltage of the attenuated single-ended voltage signal can be about 30 volts peak-to-peak. In one aspect, converting the alternating differential voltage signal to the attenuated single-ended voltage signal comprises attenuation of the alternating differential voltage signal by a fixed amount such that the attenuated single-ended voltage signal is less than or equal to the maximum attenuated voltage. In one aspect, converting the alternating differential voltage signal to an attenuated single-ended voltage signal comprises using a resistor divider to divide the alternating differential voltage signal and providing a differential input to an operational amplifier having a single-ended output. At step 406, the single-ended voltage signal is dynamically scaled by multiplying the attenuated single-ended voltage signal by a scaling factor. In one aspect, the scaling factor is selected to maximize a signal-to-noise ratio of the scaled attenuated single-ended voltage signal. In one aspect, dynamically scaling the attenuated single-ended voltage signal by multiplying the attenuated single-ended voltage signal by a scaling factor comprises selecting the scaling factor such that a product of the scaling factor times the attenuated single-ended voltage signal is less than or equal to a maximum input signal voltage, as described herein. In one aspect, the maximum input signal voltage can be about 6.5 volts peak-to-peak. In one aspect, dynamically scaling the attenuated single-ended voltage signal by multiplying the attenuated single-ended voltage level by the scaling factor comprises dynamically scaling the attenuated single-ended voltage signal using a scaling op-amp circuit that has a digital potentiometer controlled by an field programmable gate array (FPGA) or digital processor. In one aspect, the FPGA or digital processor dynamically scales the attenuated single-ended voltage signal by receiving a digital representation of the attenuated single-ended voltage signal and adjusts the digital potentiometer such that the scaling factor times the attenuated single-ended voltage level is less than or equal to the maximum input signal voltage. In one aspect, the scaling factor is 1 or greater such as, for example, 1.0. 1.1. 1.2. 2.0, 2.5, 10.0 etc. In another aspect the scaling factor is less than 1 such as for example, 0.95, 0.90, 0.5. 0.33, 0.10. 0.01, etc.

Figure 5:
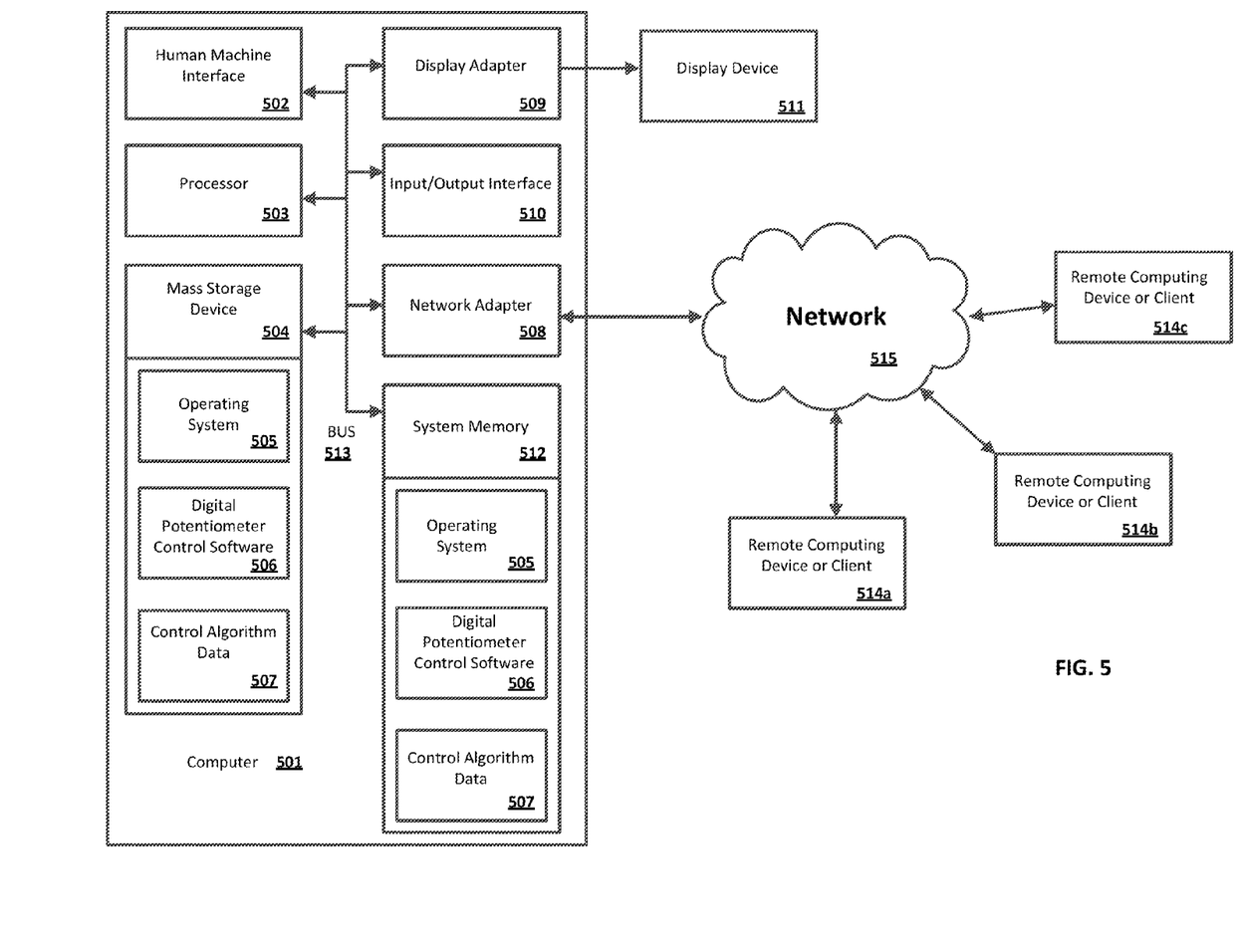
FIG. 5 is a block diagram illustrating an exemplary operating environment for performing the disclosed methods.

The above system has been described as comprised of units (e.g., the FPGA or digital processor 110, etc.). One skilled in the art will appreciate that this is a functional description and that software, hardware, or a combination of software and hardware can perform the respective functions. A unit, such as the FPGA or processor 110 can be software, hardware, or a combination of software and hardware. The units can comprise the digital potentiometer control software 506 as illustrated in FIG. 5 and described below. In one exemplary aspect, the units can comprise a computer 501 as illustrated in FIG. 5 and described below. In one aspect, the processor 503 of the computer 501 can be used to execute the algorithm described above as embodied in computer-executable code and to control the digital potentiometer 302 as described herein.

FIG. 5 is a block diagram illustrating an exemplary operating environment for performing the disclosed methods.

This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, embedded processing units, personal computers, server computers, laptop devices, and multiprocessor systems. Additional examples comprise machine monitoring systems, programmable consumer electronics, network PCs, minicomputers, mainframe computers, smart meters, smart-grid components, distributed computing environments that comprise any of the above systems or devices, FPGA's, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, digital potentiometer control software 306, control algorithm data 307 (e.g., the values for $Value_L$ and $Value_U$, gain or attenuation settings, etc.), a network adapter 508, system memory 512, an Input/Output Interface 510, a display adapter 509, a display device 511, and a human machine interface 502, can be contained within one or more remote computing devices or clients 514a,b,c at physically separate locations, connected through buses of this form, in effect implementing a fully distributed system or distributed architecture.

The computer 501 typically comprises a variety of computer readable media. Exemplary readable media can be any available media that is non-transitory and accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as control algorithm data 507 and/or program modules such as operating system 505 and digital potentiometer control software 506 that are immediately accessible to and/or are presently operated on by the processing unit 503.

In another aspect, the computer 501 can also comprise other non-transitory, removable/non-removable, volatile/non-volatile computer storage media. By way of example, FIG. 5 illustrates a mass storage device 504 that can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and digital potentiometer control software 506. Each of the operating system 505 and correlation software 506 (or some combination thereof) can comprise elements of the programming and the digital potentiometer control software 506. Control algorithm data 507 can also be stored on the mass storage device 504. Control algorithm data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown), which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices or clients 514a,b,c. By way of example, a remote computing device 514 can be a personal computer, portable computer, a server, a router, a network computer, a smart meter, a vendor or manufacture's computing device, smart grid components, a peer device or other common network node, and so on. Logical connections between the computer 501 and a remote computing device or client 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and other networks 515 such as the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of digital potentiometer control software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The following examples are put forth so as to provide those of ordinary skill in the art with a complete disclosure and description of how the systems, articles, devices and/or methods claimed herein are made and evaluated, and are intended to be purely exemplary and are not intended to limit the scope of the methods and systems. Efforts have been made to ensure accuracy with respect to numbers, but some errors and deviations should be accounted for.

In one exemplary non-limiting application, an embodiment of the present invention can be used in a turbine blade monitoring system, though other uses are contemplated within the scope of the invention. For example, sensors 102 as described herein can be used to detect changes in the time of arrival (TOA) of turbine blades in a stage of a gas turbine. Changes in the TOA can be an indication of blade failure.

Industrial gas turbines have had challenges with compressor blade "liberation" events that have resulted in the complete destruction of rotors. These events have been caused by fatigue cracks that initiated in the blade and propagated until final fracture took place. The liberated blade usually causes massive damage to the rotor. To detect this problem before catastrophic failure, a blade monitoring system was designed to detect developing cracks in the compressor stages of industrial gas turbine engines that calculates and stores blade time-of-arrival (TOA) data.

The basic principle of blade-pass measurement involves establishing a time reference using a once-per-turn (keyphasor) transducer, then, for each blade in a row, measuring the time of arrival (TOA) of the blade as it moves past a blade pass detection transducer. Dynamic and static changes in TOA are analyzed to detect shifts in blade resonance frequencies and/or static lean that may indicate the presence of a crack.

Because sensors go through a range of voltages as the machine ramps from zero to full speed (blade tip speeds can exceed the speed of sound at full machine speed), the sensor outputs need to be scaled (i.e. amplified or attenuated) during the ramp-up process in order to improve signal to noise ratio at lower voltages and to avoid clipping at distortion at high voltage levels. This allows the sensor outputs to be used to perform TOA calculations in order to monitor turbine blade health. Therefore, embodiments of the systems and methods described herein can be used to meet those requirements.

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 503 discussed above with reference to FIG. 5, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., one or more processors 503 of FIG. 5) to function in a particular manner, such that the instructions stored in the computer-readable memory produce an article of manufacture including computer-readable instructions for implementing the function specified in the flowchart block or blocks.

The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving, from a sensor, an alternating differential voltage signal, wherein said alternating differential voltage signal has an amplitude that changes over time;
   converting said alternating differential voltage signal to an attenuated single-ended voltage signal; and
   dynamically scaling said attenuated single-ended voltage signal by multiplying said attenuated single-ended voltage signal by a scaling factor, wherein said scaling factor is selected relative to a signal-to-noise ratio of the scaled attenuated single-ended voltage signal.

2. The method of claim 1, wherein said alternating differential voltage signal has a maximum peak-to-peak value and converting said alternating differential voltage signal to an attenuated single-ended voltage signal comprises said alternating differential voltage signal multiplied by a ratio of a maximum attenuated voltage to the maximum peak-to-peak value.

3. The method of claim 2, wherein the maximum peak-to-peak value of the alternating differential voltage signal is about 250 volts peak-to-peak and the maximum attenuated voltage of the attenuated single-ended voltage signal is about 30 volts peak-to-peak.

4. The method of claim 1, wherein converting said alternating differential voltage signal to the attenuated single-ended voltage signal comprises attenuation of the alternating differential voltage signal by a fixed amount such that said attenuated single-ended voltage signal is less than or equal to a maximum attenuated voltage.

5. The method of claim 1, wherein dynamically scaling said attenuated single-ended voltage signal by multiplying said attenuated single-ended voltage signal by a scaling factor comprises selecting the scaling factor such that a product of the scaling factor times the attenuated single-ended voltage signal is less than or equal to a maximum input signal voltage.

6. The method of claim 5, wherein the maximum input signal voltage is about 6.5 volts peak-to-peak.

7. The method of claim 5, wherein dynamically scaling said attenuated single-ended voltage signal by multiplying said attenuated single-ended voltage level by the scaling factor comprises dynamically scaling the attenuated single-ended voltage signal using a scaling op-amp circuit that has a digital potentiometer controlled by an field programmable gate array (FPGA) or digital processor.

8. The method of claim 7, wherein the FPGA or digital processor dynamically scale the attenuated single-ended voltage signal by receiving a digital representation of the attenuated single-ended voltage signal and adjusting the digital potentiometer such that the scaling factor times the attenuated single-ended voltage level is less than or equal to the maximum input signal voltage.

9. The method of claim 1, wherein the scaling factor is 1 or greater.

10. The method of claim 1, wherein the scaling factor is less than 1.

11. The method of claim 1, wherein converting said alternating differential voltage signal to an attenuated single-ended voltage signal comprises using a resistor divider to divide the alternating differential voltage signal and providing a differential input to an operational amplifier having a single-ended output.

12. The method of claim 1, wherein receiving, from a sensor, the alternating differential voltage signal comprises receiving the alternating differential voltage signal from a variable reluctance sensor.

13. The method of claim 12, wherein the alternating differential voltage signal produced by the variable reluctance sensor is related to a target's material composition, a gap between the sensor and the target, and a speed at which the target passes the sensor.

14. The method of claim 13, wherein the target is a turbine blade.

15. A system comprised of:
- a sensor configured to produce an alternating differential voltage signal that has an amplitude that changes over time;
- a first circuit, wherein said first circuit receives the alternating differential voltage signal and converts the alternating differential voltage signal to an attenuated single-ended voltage signal; and
- a second circuit, wherein said second circuit dynamically scales said attenuated single-ended voltage signal by multiplying said attenuated single-ended voltage signal by a scaling factor, wherein said scaling factor is selected relative to a signal-to-noise ratio of the scaled attenuated single-ended voltage signal.

16. The system of claim 15, wherein said alternating differential voltage signal has a maximum peak-to-peak value and the first circuit converts the alternating differential voltage signal to an attenuated single-ended voltage signal by multiplying the alternating differential voltage signal by a ratio of a maximum attenuated voltage to the maximum peak-to-peak value.

17. The system of claim 16, wherein the maximum peak-to-peak value of the alternating differential voltage signal is about 250 volts peak-to-peak and the maximum attenuated voltage of the attenuated single-ended voltage signal is about 30 volts peak-to-peak.

18. The system of claim 15, wherein the first circuit converting said alternating differential voltage signal to the attenuated single-ended voltage signal comprises the first circuit attenuating the alternating differential voltage signal by a fixed amount such that said attenuated single-ended voltage signal is less than or equal to a maximum attenuated voltage.

19. The system of claim 15, wherein the second circuit dynamically scaling said attenuated single-ended voltage signal by multiplying said attenuated single-ended voltage signal by a scaling factor comprises a field programmable gate array (FPGA) or digital processor associated with the second circuit automatically setting the scaling factor such that a product of the scaling factor times the attenuated single-ended voltage signal is less than or equal to a maximum input signal voltage.

20. The system of claim 19, wherein the maximum input signal voltage is about 6.5 volts peak-to-peak.

21. The system of claim 19, wherein the second circuit dynamically scaling said attenuated single-ended voltage signal by multiplying said attenuated single-ended voltage level by the scaling factor comprises the second circuit dynamically scaling the attenuated single-ended voltage signal using a scaling op-amp circuit that has a digital potentiometer controlled by the FPGA or digital processor.

22. The system of claim 21, wherein the FPGA or digital processor scales the attenuated single-ended voltage signal by receiving a digital representation of the attenuated single-ended voltage signal from an analog to digital converter (ADC) and automatically adjusting the digital potentiometer such that the scaling factor times the attenuated single-ended voltage level is less than or equal to the maximum input signal voltage.

23. The system of claim 15, wherein the scaling factor is 1 or greater.

24. The system of claim 15, wherein the scaling factor is less than 1.

25. The system of claim 15, wherein the first circuit comprises a resistor divider and an operational amplifier having a single-ended output, and converting said alternating differential voltage signal to an attenuated single-ended voltage signal comprises using the resistor divider to divide the alternating differential voltage signal and providing a differential input to the operational amplifier having a single-ended output.

26. The system of claim 15, wherein the sensor is a variable reluctance sensor.

27. The system of claim 26, wherein the alternating differential voltage signal produced by the variable reluctance sensor is related to a target's material composition, a gap between the sensor and the target, and a speed at which the target passes the sensor.

28. The system of claim 27, wherein the target is a turbine blade.

* * * * *